J. W. KENNEDY.
Hose-Couplings.

No. 150,764. Patented May 12, 1874.

Attest:
W. G. Gaines
Fred W. Blackman

Inventor.
Josiah W Kennedy

UNITED STATES PATENT OFFICE.

JOSIAH W. KENNEDY, OF ST. LOUIS, MISSOURI.

IMPROVEMENT IN HOSE-COUPLINGS.

Specification forming part of Letters Patent No. 150,764, dated May 12, 1874; application filed November 20, 1873.

*To all whom it may concern:*

Be it known that I, JOSIAH W. KENNEDY, of the city and county of St. Louis, and State of Missouri, have invented a certain Improved Hose-Coupling, of which the following is a specification:

This invention consists in the provision in the end of the hose of an annular rim of metal, having a triangular section, into which screws a tube-section, which forces forward a sleeve, on the outside of the hose, to clamp the hose against the side of the annular rim. The tube-section and sleeve may be made somewhat conical, so that they will also clamp the hose between them when the tube-section is screwed into place.

Figure 1:
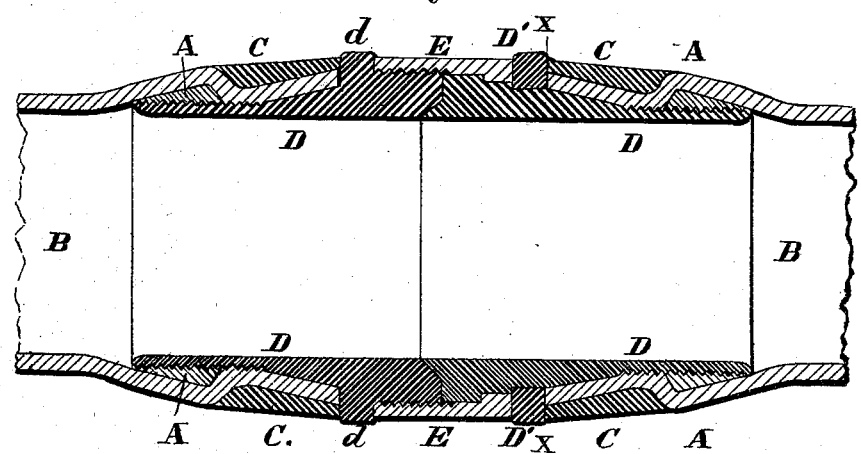
Figure 2:
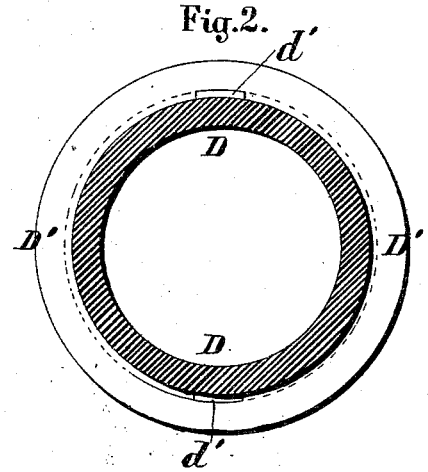

Figure 1 is a longitudinal section. Fig. 2 is a transverse section at X X.

A is the annular rim, preferably of a triangular section, arranged inside the end of the hose B. C is a sleeve, arranged on the outside of the hose B. D is a screw-threaded tube-section, which screws into the rim A, and which is provided with a projecting rim or flange, $d$ D', against which abuts the sleeve C, and as said tube-section is screwed into the rim A it forces the sleeve C forward to clamp the hose B against the rim A. The tube-section and the opening of the sleeve C may be made slightly conical, as shown, so as to clamp the hose between them as the tube-section is screwed into place.

In the male part of the coupling the flange $d$ may form part of the tube-section D, but in the female part it must be made removable, as shown, so as to allow the introduction of the coupling-sleeve E into place. Said rim or flange D' is prevented from turning on the tube-section D by the feathers $d'$, as indicated in Fig. 2.

The usual rubber packing or ground joint may be used between the tube-sections D D to form a water-tight joint between them.

In applying my said improvement to a hose-pipe, the annular rim A is first introduced inside the end of the hose B, the sleeve C is then slipped on the outside of the hose, and then the tube-section is screwed into place, and in its forward motion clamps the hose, as before described.

I claim as my invention—

1. The combination of the annular rim A, sleeve C, and tube-section D $d$, with the hose B, substantially as set forth.

2. The combination of the annular rim A, sleeve C, tube section D, and removable rim D' with the hose B, substantially as set forth.

3. The combination and arrangement of the annular rim A, sleeve C, tube-section D, removable rim D', and feathers $d'$, with the coupling-sleeve E, substantially as and for the purpose set forth.

4. The combination and arrangement of the annular rims A A, sleeves C C, tube-sections D D, flanges or rims $d$ and D', feathers $d'$, and coupling-sleeve E, with the hose B, substantially as and for the purpose set forth.

JOSIAH W. KENNEDY.

Witnesses:
W. G. GAINES,
FRED. W. BLACKMAN.